F. D. EVERETT.
SLACK ADJUSTER.
APPLICATION FILED APR. 11, 1917.
1,252,792.
Patented Jan. 8, 1918.
2 SHEETS—SHEET 1.
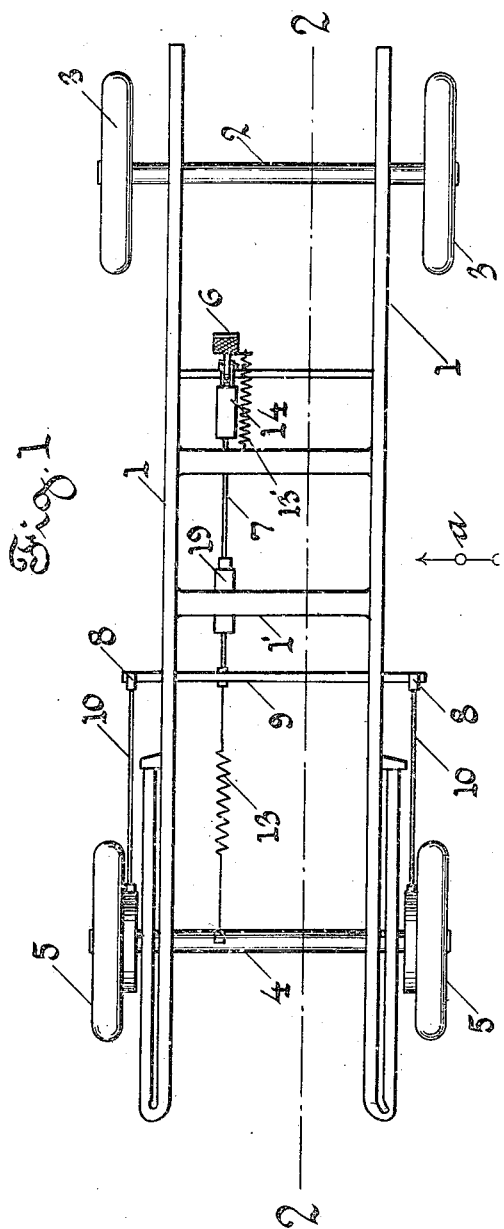
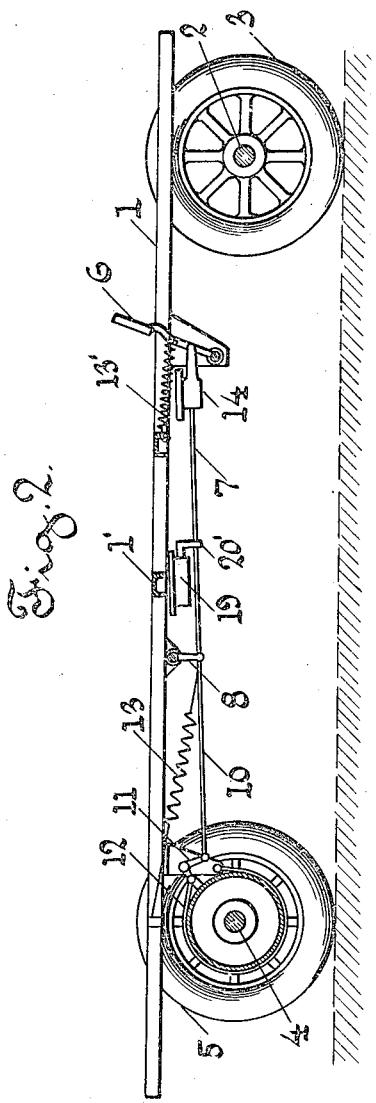
Inventor
F. Dewey Everett
By John C. Dewey.
Attorney

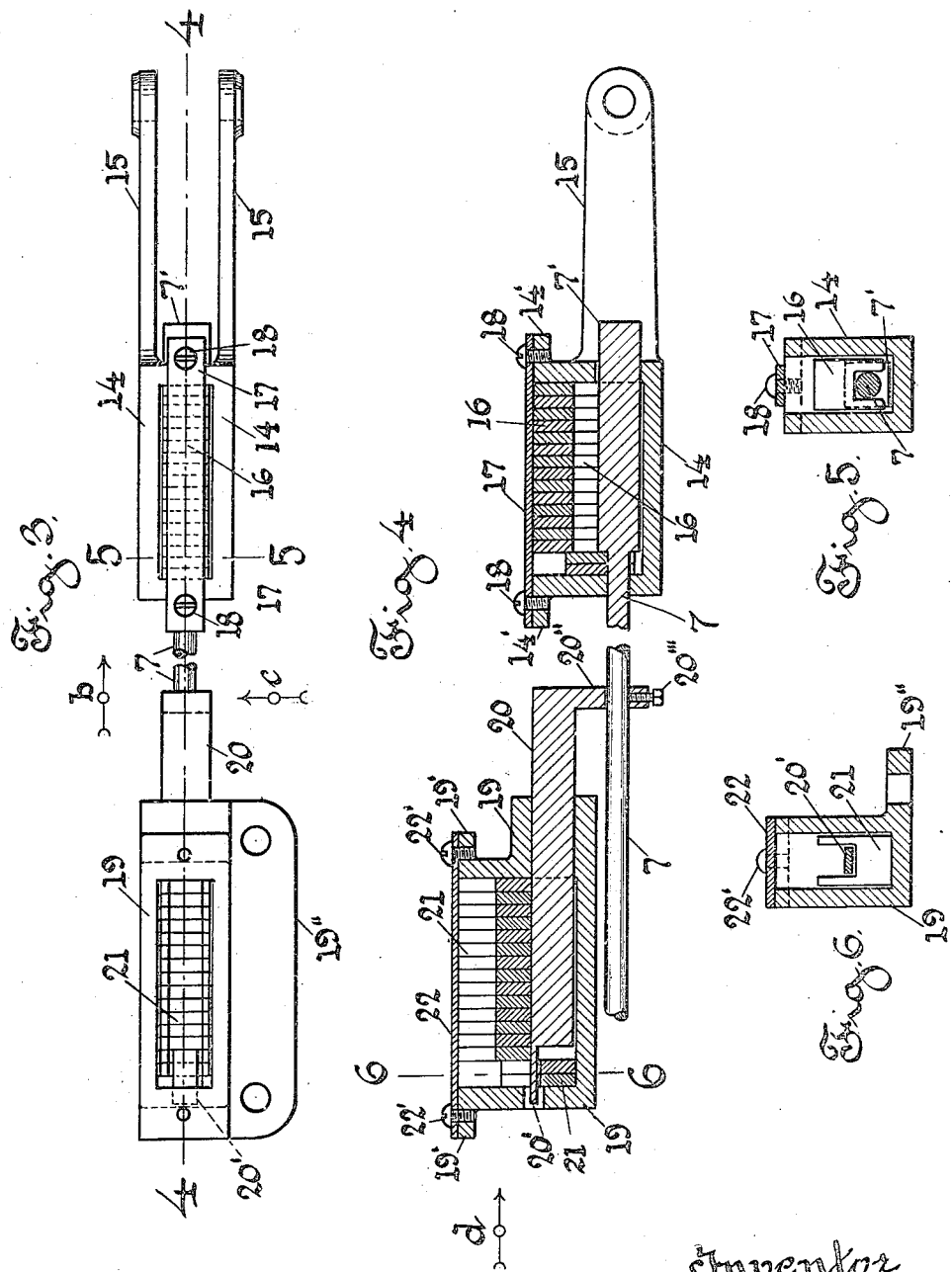
F. D. EVERETT.
SLACK ADJUSTER.
APPLICATION FILED APR. 11, 1917.
1,252,792.
Patented Jan. 8, 1918.
2 SHEETS—SHEET 2.
Inventor
F. Dewey Everett
By John C. Dewey
Attorney

UNITED STATES PATENT OFFICE.

FRANCIS DEWEY EVERETT, OF SARANAC LAKE, NEW YORK.

SLACK-ADJUSTER.

1,252,792.　　　　Specification of Letters Patent.　　Patented Jan. 8, 1918.

Application filed April 11, 1917. Serial No. 161,310.

*To all whom it may concern:*

Be it known that I, FRANCIS DEWEY EVERETT, a citizen of the United States, residing at Saranac Lake, in the county of Essex and State of New York, have invented certain new and useful Improvements in Slack-Adjusters, of which the following is a specification.

My invention relates to a slack adjuster, or mechanism for automatically taking up the wear between two friction surfaces, such as brakes on an automobile, or a friction drive mechanism, where when the tension is released, there must always be the same amount of clearance, and where the movement of the operating device is limited, as in the case of the brake pedal of an automobile.

The object of my invention is to provide an improved mechanism, which I term a "slack adjuster," to automatically take up the wear between two friction surfaces, and my invention consists in certain novel features of construction of my mechanism as will be hereinafter described.

I have shown in the drawings and described herein my improvements in slack adjuster applied to brakes of an automobile, but it will be understood that my slack adjuster may be applied to and used in connection with other classes of apparatus, or mechanisms.

Referring to the drawings:—

Figure 1 is a plan view of an automobile chassis, or frame, with my slack adjuster mechanism combined therewith.

Fig. 2 is a longitudinal section, on line 2, 2, Fig. 1, looking in the direction of arrow *a*, same figure.

Fig. 3 shows, on an enlarged scale, a plan view of my slack adjuster mechanism detached.

Fig. 4 is a longitudinal section, on line 4, 4, Fig. 3, looking in the direction of arrow *c*, same figure.

Fig. 5 is a section, on line 5, 5, Fig. 3, looking in the direction of arrow *b*, same figure.

Fig. 6 is a section, on line 6, 6, Fig. 4, looking in the direction of arrow *d*, same figure.

In the accompanying drawings, 1 is the frame of an automobile, which may be of any ordinary construction, 2 is the front axle, 3, 3 the front wheels, 4 is the rear axle, and 5, 5 the rear wheels. 6 is the foot brake pedal, 7 is the rod, which connects the brake pedal 6 with the lever 8 on the cross rod 9. The cross rod 9 is connected, through rods or connections 10, with the angle levers 11, which are connected with the brake band 12 of the brake mechanism, in the usual and well known way. 13 is a spring, which is connected at one end with a downwardly extending arm on the cross rod 9 and at its other end with some stationary part of the machine, and acts to release the brake when the foot pedal is released, 13' is a spring, connected to the frame and to the foot brake pedal 6, to return the foot pedal to its normal position.

I will now describe my improvements in slack adjuster, which are shown in this instance combined with the foot brake mechanism of an automobile, and particularly combined with the foot brake pedal, and the rod which connects said pedal with the brake mechanism.

A box or casing 14 has the two forwardly extending arms 15, 15, forming a fork, between which extends the foot brake pedal 6. A stud extends through openings in the ends of said arms 15 and an opening in the foot brake pedal 6, and pivotally connects said pedal to said arms.

The connecting rod 7 has the enlarged end 7', preferably of square shape in cross section, see Fig. 5, which is located in the lower part of the box or casing 14, and moves freely in a lengthwise direction, through openings in the ends of said box at the lower part thereof. Within the box or casing 14 are located a series of separate plates or washers 16, each of which has a forked shaped open end of sufficient size to loosely receive the rod 7. The plates or washers 16 are normally supported on the enlarged end 7' of the rod 7, and in case of the rod 7 moving a sufficient distance to the right, Figs. 3, and 4, one or more of the plates or washers 16, will be released, to drop down onto the circular part of the rod 7, as shown in Fig. 5, and extend between the end of the box or casing 14, and the square end 7' on the rod 7, as shown in Fig. 4, to hold the rod 7 in its forward position.

A cover or top 17 extends over the top of the box or casing 14, and the upper ends of the plates or washers 16, and is secured in place, in this instance by screws 18 extending through two lugs or projections 14' on each end of the box 14.

If preferred the top or cover 17 may be made with spring fingers or extensions, adapted to bear on the top of the plates or washers 16, and act to force them downwardly to straddle the rod 7, instead of allowing them to drop by gravity.

In connection with the box or casing 14, and other parts connected therewith, and above described, I have a second box or casing 19, see Figs. 3, and 4, which has a bar or slide 20 located in the lower part thereof, and extending through an opening in one end thereof, and having a projection 20′ thereon extending through an opening in the other end of said casing 19. The bar 20 is adapted to have a sliding motion in the casing 19. Within the box or casing 19 is a series of plates or washers 21, which are cut out or recessed in their upper part to form an open end slot. The plates or washers 21 normally rest upon the bar 20, but when the bar 20 is drawn to the right, Figs. 3, and 4, so that the projection 20′ will extend within the casing 19, and beyond one or more of the plates or washers 21, said plates or washers 21 will drop down to the lower part of the casing 19, and extend between the end of the bar 20, and the end of the casing 19, to form a stop for the bar 20, and on the return of the bar 20 to the left, the projection 20′ will extend through the upper forked open ends of the plates or washers 21, as shown at the left in Fig. 4.

A cover 22 extends over the upper open end of the box 19, and over the upper ends of the washers or plates 21, and is secured to the box by screws 22′ extending through two lugs or projections 19′ on the box 19. The cover 22 may have spring fingers to rest upon the upper ends of the plates or washers 21, if preferred.

The bar 20 has a downward projection or extension 20″ on its inner end, which has an opening therethrough, through which the rod 7 extends, as shown in Fig. 4. A set screw 20‴ in this instance secures the extension 20″ to the rod 7, to cause said bar to move with the rod 7.

The box or casing 14 is, as above described, connected with the foot brake pedal 6, and is mounted on the inner end of the rod 7, and is supported by said foot brake pedal, and said rod. The box or casing 19 has a side extension or flange 19″ thereon, which in this instance is bolted or secured to the transverse bar 1′, of the frame 1, and supported by said bar, in a fixed position.

From the above description in connection with the drawings, the operation of my slack adjuster mechanism will be readily understood by those skilled in the art.

In the normal operation of the foot brake pedal 6, on the forward movement of said pedal, to apply the brakes, the box or casing 14, pivotally connected, through arms 15 with the brake pedal 6, will be moved forward or toward the front of the machine with the brake pedal, and the rod 7, the square end of said rod bearing against the rear end of the casing 14, will also be moved forward or toward the front of the machine. The movement of the rod 7 will cause the forward movement of the bar 20, through the connection of the extension 20″ thereon with the rod 7, and through the connections intermediate the rod 7 and the brake mechanism, the brake mechanism will be operated to apply the brakes.

Until there is some wear of the brake bands, or friction surfaces, the plates or washers 16, and 21, will remain in their raised position, but as the brake bands, or friction surfaces wear, the rod 7, through the foot brake pedal 6, will be moved farther to the right in the direction of the front of the machine, in order to apply the brakes to the full amount, and as the wear increases the forward movement of the rod 7, through the movement of the foot brake pedal 6, will be sufficient to allow one or more of the plates or washers 21 to drop down by the extension 20′ on the bar 20, as shown in Fig. 6, when the rod 7 is in its forward position, and on the return movement of the rod 7, the bar 20 being held by one or more of the plates or washers 21, and through the attachment of said bar 20 to the rod 7, the rod 7 will also be held, and its movement limited on its return movement by the thickness of one or more of the plates or washers 21, and consequently the enlarged end 7′ on the rod 7, will not strike against the inner end of the box or casing 14, and one or more of the plates or washers 16 will drop down on the rod 7, between the enlarged end 7′ of the rod 7, and the end of the box or casing 14, as shown in Fig. 5.

In this way the slack, caused by the wear of the brake bands, or friction surfaces, will be adjusted or taken up, and the operation of the foot brake pedal will cause the same movement of the friction brake surfaces, without any manual adjustment of the connections between the foot brake pedal, and the friction brake surfaces.

The length of the connection, between the foot brake pedal, and the friction brake surfaces, is automatically adjusted or regulated, in case of wear of the brake surfaces, through the dropping down of the plates or washers 16, and 21, which act to shorten the connections between the foot brake pedal, and the brake surfaces. The plates or washers 16, and 21 are of the same thickness.

The length of the extension 20′, on the bar 20, is such as to allow of only just enough movement of the rod 7 to apply the brakes to the full on, when the bar 20 is moved forwardly, and the end of the projection 20′ extends below the last one of the plates or washers 21, at the rear end of the box or casing 19, to prevent the dropping of said plate or washer.

It will be understood that the details of construction of my improvements may be varied if desired.

Having thus described my invention, what I claim as new and desire to secure by Letters Patent is:

1. A slack adjuster to automatically take up the wear between two friction surfaces, comprising friction applying mechanism, and two devices combined therewith, one of said devices consisting of a movable box or casing connected with said friction applying mechanism, and containing a series of separate plates or washers, each having an open lower end, and said washers, supported upon the enlarged end of a rod forming a part of said friction applying mechanism, and adapted to drop down upon the reduced portion of said rod, and the other of said devices consisting of a stationary box or casing, secured in a fixed position, and containing a series of separate plates or washers, and said washers, supported upon a movable bar attached to the above mentioned rod, and adapted to drop down between the end of said bar and the end of said box or casing, the dropping down of said plates or washers in said movable box or casing, and in said stationary box or casing, acting to automatically adjust or regulate the length of said rod, forming a part of the friction applying mechanism.

2. A slack adjuster to automatically take up the wear between two friction surfaces, comprising friction applying mechanism, and two devices combined therewith, one of said devices consisting of a movable box or casing connected with said friction applying mechanism, and containing a series of separate plates or washers, each having a forked shaped open lower end, and said washers, supported upon the enlarged end of a rod forming a part of the friction applying mechanism, and adapted to drop down upon a reduced portion of said rod, and the other of said devices consisting of a stationary box or casing, secured in a fixed position, and containing a series of separate plates or washers, each having a forked shaped open upper end, and supported upon a movable bar attached to the above mentioned rod, and said bar having an extension thereon, adapted to enter the open forked end of said plates or washers, after said plates or washers have dropped down, when released by said bar and projection, the dropping down of said plates or washers in said movable box or casing, and in said stationary box or casing, acting to automatically adjust or regulate the length of said rod, forming a part of the friction applying mechanism.

3. In a slack adjuster for automobile brakes, or friction transmission, where the adjustment is made by varying the length of a rod, the combination with said rod, which extends between the brake pedal and the applying levers of the brake, of a device connected with the brake pedal and with said rod, to move therewith, said device consisting of a box or casing containing a series of separate plates or washers, each having a forked shaped open lower end, and said washers, supported upon the enlarged end of said rod and adapted to drop down upon the reduced portion of said rod between the enlarged end of said rod and the end of said box or casing, and a second device, having a part thereof stationary and secured in a fixed position, and a part thereof connected to the above mentioned rod, said device consisting of a box or casing containing a series of separate plates or washers, said washers supported upon a bar, and said bar, and said washers or plates, adapted to drop down between the end of said bar and the end of said box or casing, the dropping down of said plates or washers in said movable box or casing, and in the other box or casing, acting to automatically adjust or regulate the length of said rod, forming a part of the friction applying mechanism.

FRANCIS DEWEY EVERETT.

Witnesses:
W. R. LADD,
WM. B. TROWBRIDGE.

Copies of this patent may be obtained for five cents each, by addressing the "Commissioner of Patents, Washington, D. C."